United States Patent
Laux et al.

(10) Patent No.: US 9,864,347 B2
(45) Date of Patent: Jan. 9, 2018

(54) METHOD FOR OPTIMIZING AN OPERATING FUNCTION OF A GROUND MILLING MACHINE AND GROUND MILLING MACHINE

(71) Applicant: BOMAG GmbH, Boppard (DE)

(72) Inventors: Robert Laux, Neuwied (DE); Marco Reuter, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 342 days.

(21) Appl. No.: 14/620,799

(22) Filed: Feb. 12, 2015

(65) Prior Publication Data

US 2015/0227120 A1    Aug. 13, 2015

(30) Foreign Application Priority Data

Feb. 12, 2014 (DE) .......................... 10 2014 001 885

(51) Int. Cl.
*E01C 23/088* (2006.01)
*G05B 13/02* (2006.01)
*E01C 23/12* (2006.01)

(52) U.S. Cl.
CPC .......... *G05B 13/021* (2013.01); *E01C 23/088* (2013.01); *E01C 23/127* (2013.01)

(58) Field of Classification Search
None
See application file for complete search history.

(56) References Cited

U.S. PATENT DOCUMENTS

| 4,317,642 A * | 3/1982 | Wirtgen | E01C 23/065 404/72 |
| 4,946,307 A * | 8/1990 | Jakob | E01C 23/088 404/90 |
| 5,078,540 A * | 1/1992 | Jakob | E01C 23/088 299/39.8 |
| 6,033,031 A * | 3/2000 | Campbell | E01C 23/085 299/37.2 |
| 6,227,620 B1 * | 5/2001 | Page | E01C 23/088 125/13.03 |

(Continued)

FOREIGN PATENT DOCUMENTS

| DE | 102010050441 A1 | 10/2011 |
| DE | 102012006189 A1 | 10/2013 |

(Continued)

OTHER PUBLICATIONS

ROADTEC RX-400 Milling Machine; Operation, Service & Maintenance; 7 pages; printed from Internet on Feb. 28, 2017.*

(Continued)

*Primary Examiner* — Ronald Hartman, Jr.
(74) *Attorney, Agent, or Firm* — Wood Herron & Evans LLP

(57) ABSTRACT

The present invention relates to a method for optimizing an operating function of a ground milling machine by way of the adaptation of operating parameters and to a ground milling machine which is implemented, in particular, for carrying out this method. In an essential aspect an operating parameter of a milling machine is provided starting from a starting value of the operating parameter to optimize an operating function of the ground milling machine in milling operation.

15 Claims, 4 Drawing Sheets

(56) References Cited

U.S. PATENT DOCUMENTS

| | | | | |
|---|---|---|---|---|
| 8,128,177 B2* | 3/2012 | Menzenbach | ......... | E01C 23/088 299/1.5 |
| 8,408,838 B2* | 4/2013 | Willis | ............... | E01C 23/088 299/1.5 |
| 8,632,132 B2* | 1/2014 | Menzenbach | ......... | E01C 23/088 299/1.5 |
| 8,967,506 B2* | 3/2015 | Pike, Sr. | ............... | C04B 28/04 241/30 |
| 2005/0207841 A1* | 9/2005 | Holl | ............... | B28D 7/00 404/94 |
| 2006/0076821 A1* | 4/2006 | Troudt | ............... | B24B 7/188 299/39.2 |
| 2008/0173740 A1* | 7/2008 | Parker | ............... | E01C 23/088 241/33 |
| 2009/0035064 A1* | 2/2009 | Holl | ............... | B28D 7/00 404/90 |
| 2010/0014917 A1* | 1/2010 | Willis | ............... | E01C 23/088 404/93 |
| 2010/0021234 A1* | 1/2010 | Willis | ............... | B62D 7/026 404/90 |
| 2011/0080034 A1* | 4/2011 | Schonebeck | ......... | E01C 23/088 299/1.5 |
| 2011/0272997 A1* | 11/2011 | Gaertner | ............... | E01C 23/088 299/1.5 |
| 2011/0298188 A1 | 12/2011 | Haubrich et al. | | |
| 2013/0002002 A1* | 1/2013 | Menzenbach | ......... | E01C 23/088 299/1.5 |
| 2013/0087172 A1 | 4/2013 | Roetsch | | |
| 2013/0300182 A1* | 11/2013 | Hammes | ............... | E01C 23/088 299/39.4 |
| 2014/0070598 A1* | 3/2014 | von Schoenebeck | . | E01C 23/088 299/10 |
| 2014/0093315 A1* | 4/2014 | Sansone | ............... | E01C 23/088 404/91 |
| 2014/0191560 A1* | 7/2014 | Gaertner | ............... | E01C 23/088 299/1.5 |

FOREIGN PATENT DOCUMENTS

| | | |
|---|---|---|
| EP | 2578749 A2 | 4/2013 |
| WO | 2013143652 A1 | 10/2013 |

OTHER PUBLICATIONS

Road Building Supplement; Equipment World; Feb. 28, 2007; 14 pages; printed from Internet on Feb. 28, 2017.*

Espacenet, English Machine Translation of German Application No. DE102012006189A1, published Oct. 2, 2013, retrieved from http://worldwide.espacenet com on Feb. 11, 2015 (14 pages).

\* cited by examiner

METHOD FOR OPTIMIZING AN OPERATING FUNCTION OF A GROUND MILLING MACHINE AND GROUND MILLING MACHINE

CROSS-REFERENCE TO RELATED APPLICATIONS

The present application claims priority under 35 U.S.C. §119 of German Patent Application No. 10 2014 001 885.7, filed Feb. 12, 2014, the disclosure of which is hereby incorporated herein by reference in its entirety.

FIELD OF THE INVENTION

The present invention relates to a method for optimizing an operating function of a ground milling machine and a ground milling machine which is implemented, in particular, for carrying out the method according to the present invention.

BACKGROUND OF THE INVENTION

Ground milling machines are used wherever the removal of ground subsoil material to a desired milling depth is required. Typical areas of application are, for example, in the form of road milling machines for the removal of road cover layers, in the form of so-called stabilizers and/or recyclers for road and pathway construction, and in the form of surface miners for extracting mineral resources. Generic ground milling machines are disclosed, for example, in the patent applications EP 2 578 749 A2 and DE 10 2010 050 441 A1, to which reference is hereby made.

The operation of such ground milling machines is comparatively costly, so that the demand always exists for the most optimum possible machine operation, for example, with respect to the lowest possible fuel consumption and, at the same time, the highest possible milling performance.

In the patent applications DE 10 2012 006 189.7 and PCT/EP2013/000686, which are hereby incorporated by reference, a drive device for a self-propelled construction machine, in particular, a ground milling machine, and also a method for setting a rotational speed ratio in such a drive device, are described. The present invention is suitable, in particular, for application with this drive device or this method. An essential aspect of this patent family is that a rotational speed variable operation of the milling drum is possible. In practical use of such machines, it has been shown that various operating optima, for example, the optimum of the milling performance, i.e., the milling volume per unit of time, for example, in cubic meters per hour, and also the optimum of the milling performance efficiency, i.e., the milling performance per fuel consumption, are not always achieved with higher rotational speed of the milling drum. The rotational speed of the milling drum here refers to the number of revolutions of the milling drum about its axis of rotation per unit of time.

An object of the present invention is therefore to specify a method for optimizing an operating function of a ground milling machine by way of adaptation of operating parameters. A further object of the present invention is furthermore to specify a ground milling machine which enables carrying out such a method.

SUMMARY OF THE INVENTION

An operating parameter is in this case a manipulated variable which is relevant for the respective work operation of a ground milling machine, and which is essentially only determined by factors which are intrinsic to the ground milling machine itself, i.e., are not influenced by the operating conditions or usage conditions during the work operation (for example, the milled material). The operating parameters can thus be selected and predefined independently of the work operation, for example, manually by the operator of the ground milling machine or by an automatic controller. Examples of operating parameters are, for example, the power of the drive unit of the milling drum, the milling depth, and the rotational speed of the milling drum, etc. A variable operating parameter is an operating parameter which can be varied over the work process for process optimization. This can be the power of the drive unit and/or the rotational speed of the milling drum, for example. Non-variable or constant operating parameters, in contrast, are operating parameters which are generally not varied within the respective work operation to optimize the working mode of the ground milling machine, so that the most constant possible work result is finally obtained. For example, the milling depth is typically a non-variable or constant operating parameter, since the milling depth is generally predefined as a target variable to be set by the operator.

In contrast, those variables which are determined in work operation for relevant parts by factors which are not intrinsic to the machine itself, but rather originate from the specific work operation, are referred to as operating functions. The operating functions are thus substantially determined in work operation, with uniform operating parameters, by the usage conditions during the work operation of the ground milling machine, for example, by the properties of the ground material or milled material (ground density, ground hardness, grain size, etc.). Examples of operating functions are, for example, the advance of the ground milling machine, the milling performance of the ground milling machine, or the milling performance efficiency of the ground milling machine. In this case, the actual value of such a variable is also comprised in the concept of the operating function, as is the deviation of the actual value of such a variable from a previously established target value, for example, a target advance velocity of a milling machine. In other words, an operating function is the result of at least one operating parameter.

One aspect of the present invention is that in operation of the ground milling machine, carrying out a method is provided, during which an operating parameter of the ground milling machine, for example, the rotational speed of the milling drum, is varied in relation to a starting value, for example, a starting rotational speed, until an operating optimum is achieved. Such an operating optimum can be, for example, the maximum advance velocity of the ground milling machine, the maximum milling performance of the ground milling machine, or the maximum milling performance efficiency of the ground milling machine. It is, therefore, essential that an operating optimum is achieved by a systematic variation and adaptation of the variable operating parameter, for example, the rotational speed of the milling drum, by this method for the respective milled material, the respective milling drum, the respective milling depth, and the respective further specific usage conditions. The operating optimum refers in this case to the value of a variable operating function, under which the milling machine fulfills a specific specification for its use in the best possible manner. In a specific exemplary application, the operating parameter can be the rotational speed of the milling drum, the operating function can be the milling performance, and the specification can be that the advance velocity of the ground milling machine is to be maximum under the existing conditions. The advance velocity of the ground milling machine refers in this case to the forward movement of the ground milling machine in distance per unit of time (for example, in meters per second) in the working direction of the ground milling machine. The present invention is based in this case on the finding that the maximum possible milling performance for an available drive power is dependent as a whole on the three variables milling depth, advance velocity, and rotational speed of the milling drum. In particular, for the respective desired milling depth, a respective individual optimum rotational speed is available in this case, at which a maximum advance velocity of the ground milling machine is achievable. In this case, a variety of external factors (operating conditions) influence this optimum, for example, the ground material to be milled, the milling drum used or the milling tools used, respectively, the milling depth, etc. Proceeding from this optimum rotational speed, variations of the rotational speed into higher or lower rotational speed ranges have a negative effect on the advance velocity of the ground milling machine, in contrast. It is apparent that the spectrum of the rotational speed variability is delimited by a maximum rotational speed and a minimum rotational speed, which can accordingly also represent the optimum in particular cases. The goal of the present invention is therefore, in particular, also to specify a method for how the optimum rotational speed of the milling drum can be found for a predefined milling depth at constant drive power. The constant drive power can be, in particular, the maximum drive power of the drive device in this case.

This is specifically achieved according to the present invention in that the following method steps are executed during operation of the ground milling machine, in particular, in succession: a) predefining a starting value for a variable operating parameter; b) establishing and setting the constant operating parameters; c) ascertaining the starting value of the operating function to be optimized; d) varying the value of the variable operating parameter to an alternative value which is greater or less than the starting value of this parameter; e) checking whether the value of the operating function increases or decreases; and f) repeating steps d) and e) until reaching the desired operating optimum, for example, the maximum advance velocity, the greatest machine efficiency, etc. The step which is essential according to the present invention is therefore varying the variable operating parameter and monitoring in what regard the respective variation of the value of the variable operating parameter has an effect on the operating function to be optimized, for example, the advance velocity of the ground milling machine, in relation to a starting value of the operating function, for example, the starting advance velocity. The starting value of the operating function to be optimized is therefore the value of the operating function of the ground milling machine to be optimized, which is provided by the machine operator when beginning milling operation and before execution of steps d) to f). Accordingly, the starting value of the variable operating parameter is the value of the variable operating parameter with which the milling operation is initially started, before the variable operating parameter is varied according to steps d) to f).

In one embodiment of the method according to the present invention, the rotational speed of the milling drum constitutes the variable operating parameter, while the advance velocity of the ground milling machine represents the operating function to be optimized. By way of the variation of the rotational speed of the milling drum or ultimately the tool velocity, respectively, specifically the cutting tool in the ground subsoil material to be milled, optimization of the advance velocity of the ground milling machine is thus performed. The advance velocity of the ground milling machine in work operation is delimited at the upper end by the maximum milling performance of the milling drum under the present operating conditions (for example, density of the ground material to be milled, sharpness of the cutting tools) and operating parameters which are variable and which are typically constant in work operation (for example, milling depth, rotational speed of the milling drum). The operator of the ground milling machine can thus drive it in work operation at most as rapidly as permitted by the maximum milling performance of the milling drum under the present parameter settings. By way of the variation of the rotational speed of the milling drum, the setting-related maximum milling performance also changes, and therefore also the setting-related maximum advance velocity. The variation of the rotational speed and milling operation toward an alternative rotational speed can be performed, for example, such that the rotational speed is first increased or decreased from the starting rotational speed of the milling drum. If this results in an increase in the advance velocity at constant drive power, the rotational speed is further increased or decreased until no further increase of the advance velocity is thus achieved. In contrast, if the advance velocity decreases due to the variation of the rotational speed toward the alternative rotational speed in milling operation, the rotational speed of the milling drum is not varied further in this direction, but is rather changed in the opposite direction. If the rotational speed was first increased in relation to the starting rotational speed and this increase had a negative effect on the advance velocity of the ground milling machine (i.e., the advance velocity decreases), a reduction of the rotational speed of the milling drum in relation to the starting rotational speed is performed as the next step and vice versa. A preferred embodiment provides, in other words, that by variation of the rotational speed, an ideal rotational speed is obtained at predefined milling depth and, in particular, constant, for example, maximum drive power and therefore a milling performance of the ground milling machine which is maximum for the respective drive power and milling depth is achieved. The rotational speed is therefore regulated on the basis of the effect on the advance velocity, and by means of this on the basis of the effect on the milling performance. In this manner, the respective optimum of the advance velocity and the rotational speed of the milling drum for the respective desired milling depth in the respective ground, material are obtained particularly effectively. Overall, the optimization of this operating function for a predefined milling depth is accordingly performed empirically and adapted to the respectively provided ground conditions, so that the advantageous effects of the present invention are obtained over a particularly broad spectrum of ground characteristics, without a variety of individual usage conditions having to be determined for this purpose beforehand. Accordingly, this method is also usable on all ground subsoils to be milled and for all ground milling machines.

It is fundamentally possible that the variation of the variable operating parameter, for example, the rotational speed, is performed continuously. According to the above-described preferred embodiment, in this way, in particular, with homogeneous ground conditions, optimal maximum advance velocities can be achieved. The ground subsoils to be processed are frequently comparatively heterogeneous, however, for example, with regard to their ground density and hardness of the ground materials to be milled. As a result, the optimum rotational speed for obtaining the at least theoretically maximum advance velocity varies in a specific range. To nonetheless enable comparatively continuous milling operation of the ground milling machine, it is therefore preferable if the variation of the rotational speed according to step d) is performed at fixed rotational speed intervals. In other words, this means that the variation of the rotational speed is performed in steps, for example, in steps of plus or minus ten revolutions per minute. The graduation of the variation steps is also dependent in this case, in particular, on the diameter of the milling drum. By way of a stepwise change of the rotational speed in milling operation, a comparatively coarser result is obtained with respect to the maximum achievable advance velocity. However, in this way the overall process of steps a) to f) can be substantially shortened. In summary, this means that the operating parameter, depending on the specific embodiment of the present invention, can be varied either continuously or also at fixed intervals.

For practical use, it has further proven to be advantageous if the checking according to step e) is performed in such a manner that exceeding or falling below difference threshold values is checked. The core element of this preferred refinement is, therefore, that a decrease or increase of the operating function to be optimized, for example, the advance velocity, is only assumed to be present if a minimum amount of velocity change is present. This amount, which is referred to as a difference threshold, for example, in the magnitude of ±1 km/h, is also used for the purpose of enabling more uniform milling operation under optimized operating conditions and therefore to make the responsiveness of the present present invention slower. It is thus ensured that not every minimal change of the advance velocity results in a change of the rotational speed of the milling drum, but rather this procedure is only triggered when the changes of the advance velocity exceed the predefined difference threshold values.

Depending on the application, it can furthermore be advantageous if the above-described method according to steps a) to f) is only carried out at the beginning of the milling operation and after reaching a termination criterion, for example, reaching the maximum advance velocity in step f) for the first time, the milling operation is continued with the value of the variable operating parameter then ascertained. In this method, the above-described optimization process is only carried out again in the event of a change of the operating parameters which are constant with regard to the optimization method, for example, the milling depth, and/or with the beginning of a new milling process. Alternatively, however, it can also be preferable if steps a) to f) are continued continuously over the entire milling process. In this refinement of the method according to the present invention, an adaptation of the operating parameter of the milling drum, therefore, takes place continuously, to achieve the respective operating optimum of the ground milling machine as much as possible over the entire milling process. Finally, it is also possible that the optimization process according to the present invention is carried out over the respective operating interval at regular time intervals and/or according to established milling distance intervals covered.

In the specific exemplary embodiment, the variation of the rotational speed of the milling drum can be achieved in various ways. In the simplest case, for example, the starting rotational speed of the drive unit, for example, an internal combustion engine, can be varied. However, this procedure is disadvantageous in that the operation of the main drive unit in a comparatively constant and energetically optimum operating range is always desired. Furthermore, transmissions can principally be integrated in the drive train, for example, shift transmissions, so that continuous rotational speed variability of the milling drum is not provided. The variation of the rotational speed is then performed in accordance with the shift stages of the shift transmission. However, it is particularly preferable if the variation of the rotational speed according to step d) of the milling drum is performed at least partially via a summation transmission, in particular, a planetary transmission, by variation of at least one input rotational speed of one of at least two drive units. Such an arrangement is specified, for example, in the patent family of DE 10 2012 006 189.7, to which reference is made, in particular, in this regard. Accordingly, a total of two drive units are provided for the rotational drive of the milling drum, wherein the main drive unit runs at a comparatively constant power level. The rotational speed variation is performed mainly via the second drive unit, which can be, in particular, a lower-power auxiliary drive, in particular, an electric motor or hydraulic motor. The drive powers introduced via the two drive units are subsequently combined via the summation transmission and transmitted to the milling drum via an output shaft, which is connected to the milling drum.

It is fundamentally possible to carry out the above-described method manually. Units are preferably provided for this purpose, for example, corresponding display screens, via which the operator of the ground milling machine can observe the effects of the variation of the value of the variable operating parameter, for example, the rotational speed, on the operating function to be optimized, for example, the advance velocity. However, it is preferable if the method according to the present invention is executed in the framework of an automatic controller. Automatic controller means in this case that, in particular, the steps a) to f) and, if present, the method steps of the preferred refinements, are executed in a computer-assisted manner and without manual influence, i.e., automatically. The operator of the ground milling machine must then only activate or deactivate this operating mode, without subsequently having to take care of a further regulation of the adaptation process between variable operating parameter and operating function to be optimized. A corresponding control unit is provided for this purpose.

A further essential aspect of the present invention is furthermore a ground milling machine for milling off ground subsoil material, in particular, a ground milling machine for carrying out the method according to the present invention. Generic ground milling machines comprise a machine frame, travel units connected to the machine frame, such as, in particular, crawler tracks and/or wheels, a drive unit, such as an internal combustion engine, in particular, and a milling drum. The milling drum has, in addition to a hollow cylindrical support tube, a plurality of chisel units arranged on the outer lateral surface of the support tube, as are already described in the prior art. The milling drum is mounted directly or indirectly on the machine frame so it is rotatable about a horizontal axis of rotation extending transversely to the working direction. Furthermore, a drive train is provided, which transmits drive energy from the drive unit to the milling drum. This drive train can comprise multiple transmission steps, for example, a shift transmission and/or a belt transmission or chain gear, etc. Furthermore, the ground milling machine has a unit for ascertaining and monitoring an operating function to be optimized, for example, the advance velocity. This unit is implemented such that it either can directly measure the value of the operating function to be optimized (for example, the advance velocity of the ground milling machine), or can measure a physical variable, which has a known relationship to the operating function to be optimized (for example, the rotational speed of the travel units). Such a unit can comprise, for example, a unit for measuring the advance velocity, i.e., for example, a rotational speed sensor on one of the travel units of the ground milling machine or also another unit, via which the travel velocity of the ground milling machine can be ascertained, for example, also on the basis of the ground subsoil. Depending on the specific operating function to be optimized, the unit for ascertaining and monitoring the operating function to be optimized can also comprise, for example, a sensor for the fuel consumption of the drive unit (for example, via measurement of the rotational speed of the drive motor). The unit for ascertaining and monitoring the operating function to be optimized can also comprise a data processing unit, which is suitable for the purpose of combining various signals recorded by sensors with one another, to calculate the operating function to be optimized therefrom, for example, by multiplying the ascertained advance velocity of the ground milling machine with the set milling depth and dividing by the ascertained fuel consumption of the ground milling machine, to ascertain the milling performance efficiency of the ground milling machine.

What is essential for the implementation according to the present invention of the ground milling machine is that furthermore a control unit is provided for controlling the milling drum operation. The essential characteristic of this control unit is its implementation in such a manner that, proceeding from a predefined starting value, it varies at least one operating parameter of the ground milling machine, for example, the rotational speed of the milling drum, from a starting value to achieve a maximum operating function. Possible specific implementations of this variation according to the method has already been specified, for example, in the preceding statements on the method according to the present invention, to which reference is now also made with regard to the ground milling machine.

Fundamentally, it is possible that the method is carried out solely via the tracking of the operating function to be optimized, for example, the advance velocity. However, it is ideal if the variable operating parameter, for example, the rotational speed of the milling drum, is also monitored by means of a suitable sensor, for example, a rotational speed sensor, and transmitted to the control unit.

The control unit can be implemented in this case for manual operation, but also, preferably, for automatic control of the variable operating parameter of the milling drum in dependence on the operating function to be optimized. Reference is also made in this regard to the preceding statements. Accordingly, the ground milling machine according to the present invention is implemented, in particular, in such a manner that it automatically or independently carries out a method according to the preceding statements on the method according to the present invention.

The advantages of the present invention are particularly clear in the case of ground milling machines having comparatively high milling performance and long milling intervals. This is the case, in particular, with so-called large milling machines. The ground milling machine is preferably therefore also a road milling machine, in particular, a central rotor milling machine, which is distinguished in that the milling drum is arranged between the front and rear travel units.

Fundamentally, various alternative possibilities can be used for varying the rotational speed of the milling drum. However, it is optimal if the control unit is implemented for controlling an auxiliary drive, the drive power of which is fed via a summation transmission into a drive train between main drive unit and milling drum. In this manner, a particularly simple and simultaneously also exact change of the rotational speed of the milling drum is possible. The main drive unit can simultaneously be operated in a comparatively constant power range, whereby particularly economical operation of the ground milling machine is possible. The summation transmission is specifically a planetary transmission, for example.

The auxiliary drive can be, in particular, an electric motor or a hydraulic motor in this case, wherein it is then particularly preferable if the drive energy required for the operation of the electric motor or the hydraulic motor is also supplied by the main drive unit.

BRIEF DESCRIPTION OF THE DRAWINGS

The present invention is described in greater detail below on the basis of the exemplary embodiments indicated in the figures. In the schematic figures.

Like components are indicated in the figures with like reference signs, wherein not every repeating component is separately identified.

DETAILED DESCRIPTION OF THE INVENTION

Figure 1:
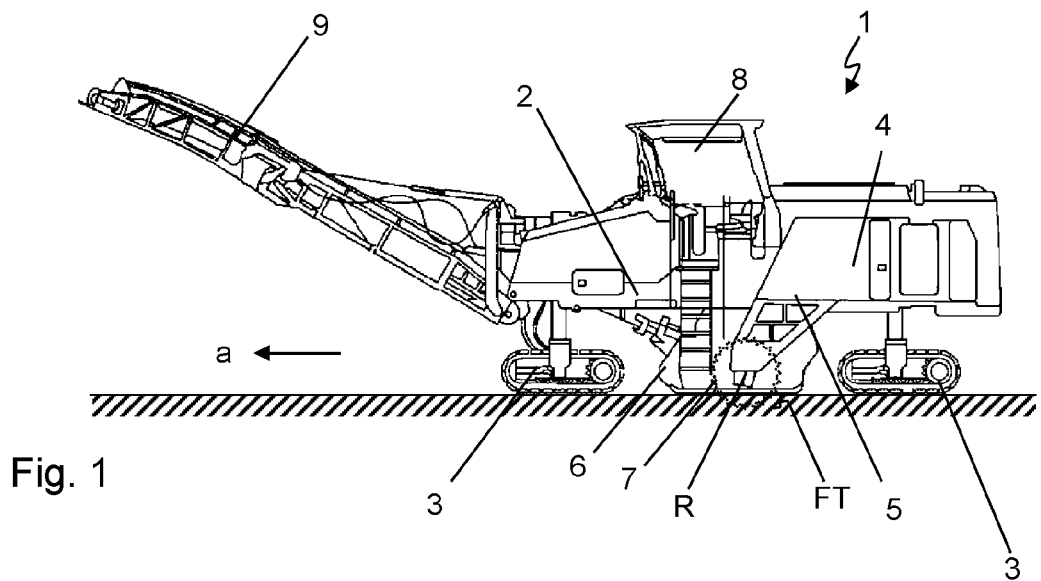
FIG. 1 shows a side view of a ground milling machine.
Figure 2:
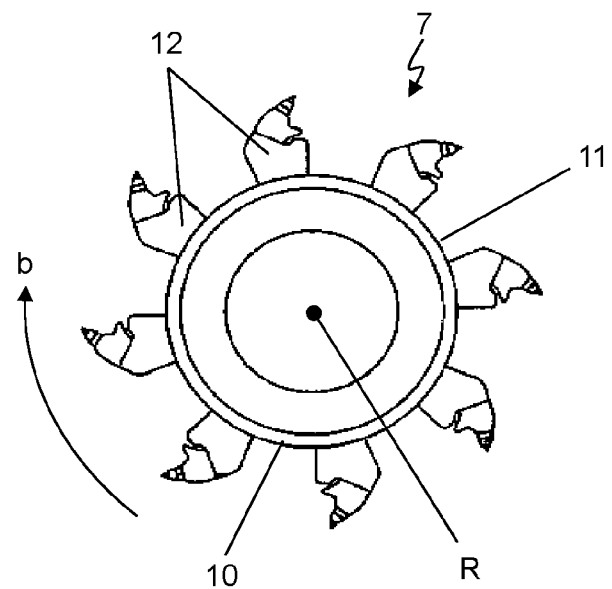
FIG. 2 shows a side view of a milling drum.

Essential elements of the ground milling machine 1, which is implemented as a road milling machine of the middle rotor milling machine type, shown in FIG. 1 are, in particular, a machine frame 2, travel units 3, and a main drive unit 4 not indicated in greater detail, which is connected to a milling drum 7 arranged in a milling drum box 6 via a drive train 5. Furthermore, a driver's cab 8 and a conveyor belt 9 are provided, via which milled material can be transported away from the ground milling machine 1. In work operation, the ground milling machine 1 travels, with the milling drum 7 lowered into the ground subsoil at the milling depth FT, in the working direction a over the ground subsoil, milling off ground subsoil material to the desired depth at the same time.

Figure 3:
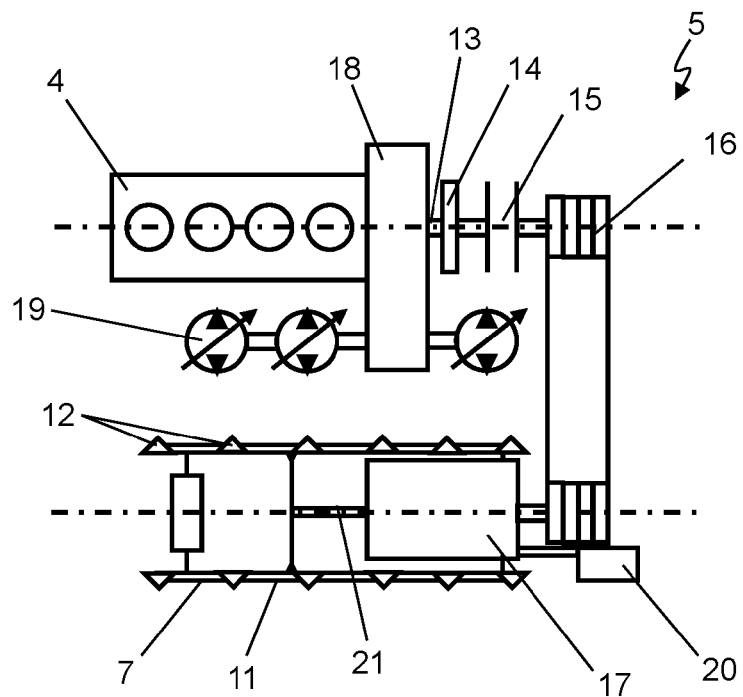
FIG. 3 shows an outline sketch of a drive train of the ground milling machine from FIG. 1 with milling drum.

The essential element of the milling drum 7, which is only indicated very schematically in FIG. 1, is a hollow-cylindrical support tube 10, on the outer jacket surface 11 of which a plurality of milling tools 12 are arranged. In milling operation, the milling drum 7 rotates about the axis of rotation R, which extends horizontally and transversely to the working direction a, in the rotation direction b and mills off ground subsoil material. The velocity at which the individual milling tools 12 are driven in the circumferential direction b through the ground subsoil is also referred to as the tool velocity. The drive train 5 of the ground milling machine 1 is indicated in greater detail in FIG. 3. The drive train 5 transmits drive energy from the main drive unit 4, which is implemented as an internal combustion engine, to the milling drum 7. For this purpose, an elastic clutch 14, a shift clutch 15, a belt drive 16, and a drive transmission 17 are connected to the output shaft 13 of the internal combustion engine 4. Furthermore, a transfer case 18 is arranged between the internal combustion engine 4 and the elastic clutch 14, to which multiple hydraulic pumps 19 are connected in the present example. Furthermore, a secondary drive or auxiliary drive 20 is provided, which also discharges into the drive transmission 17. On the output side, the drive transmission 17 has an output shaft 21, via which rotational movement is transmitted to the support tube 10. Further details on the construction of the drive train 5 are indicated in FIG. 3. Accordingly, the drive transmission 17 is implemented as a planetary transmission and acts as a summation transmission, wherein drive energy is fed via the input shafts 22 and 23 from the drive unit 4 and from the auxiliary drive 20 and is transmitted via the output shaft 21 from the planetary transmission 17 to the support tube 10. In the exemplary embodiment indicated in FIG. 4, the drive unit 4 drives the hydraulic pump 19, which are used to drive the auxiliary drive 20, which is implemented as a hydraulic motor.

As essential feature, a control unit 24 is provided, via which a change of the rotational speed of the milling drum 7 to optimize the advance velocity of the ground milling machine 1 is enabled. The control unit 24 is firstly connected to a velocity sensor 25 for this purpose, via which the advance velocity of the ground milling machine 1 can be ascertained. The velocity sensor 25 is arranged for this purpose on one of the travel units 3 in the specific exemplary embodiment. The control unit 24 is furthermore connected to a rotational speed sensor 26, via which the rotational speed of the milling drum 7 can be ascertained, said rotational speed sensor 26 being optional however. The control unit 24 is also connected to the drive train 5, in particular, the drive unit 4, and the auxiliary drive 20, and can, in particular, control the drive power of the auxiliary drive 20. The way in which the control is specifically performed is specified in greater detail, in particular, in FIG. 7, which is described in more detail below.

Figure 4:
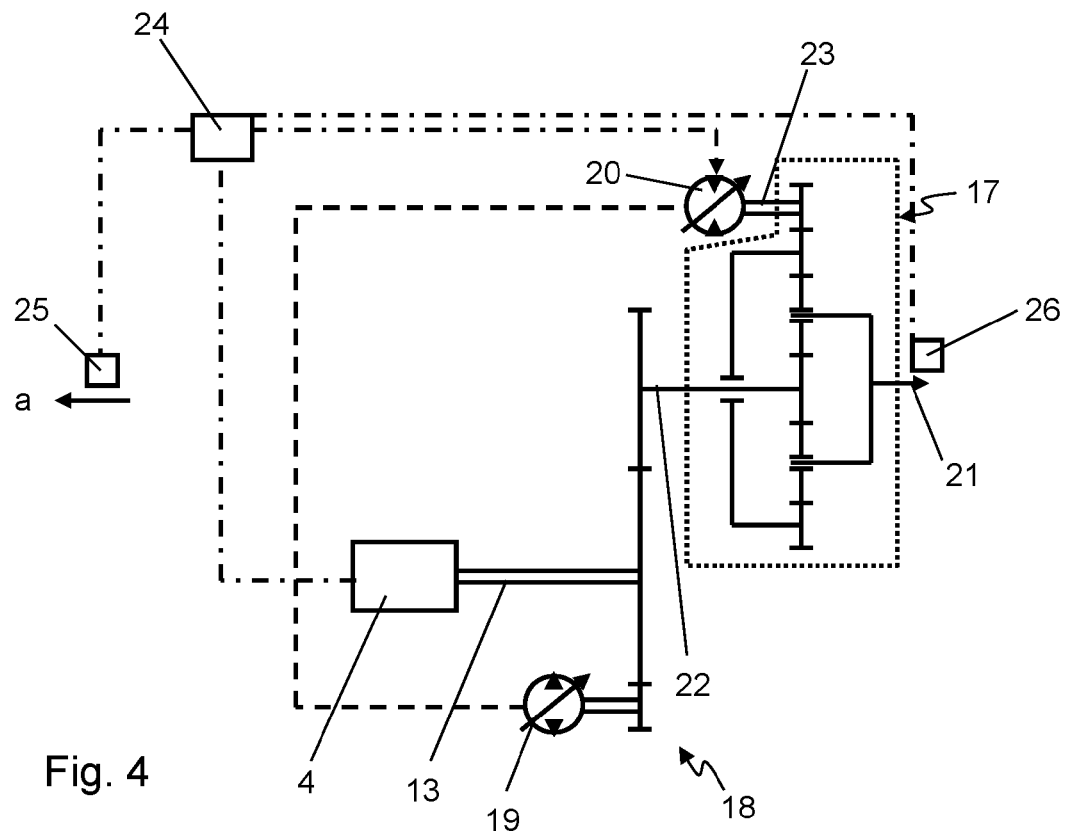
FIG. 4 shows further details of the outline sketch from FIG. 3.
Figure 5:
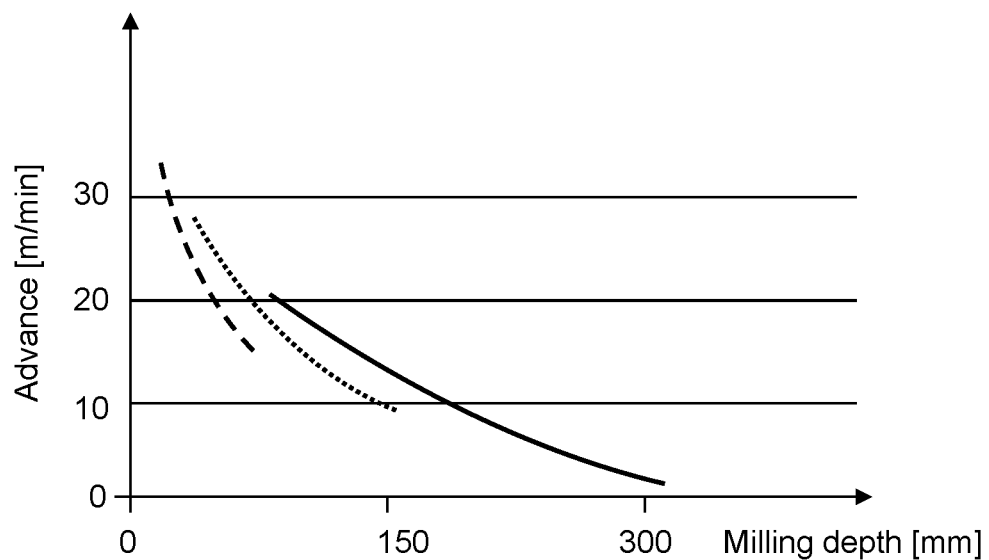
FIG. 5 shows a graph to illustrate the advance velocity in dependence on the milling depth at various rotational speeds of the milling drum.
Figure 6:
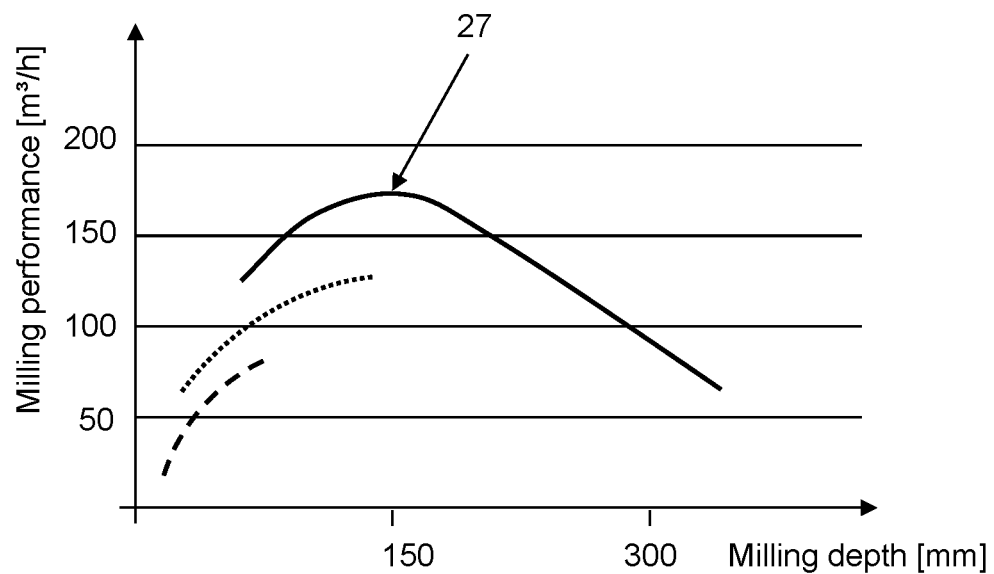
FIG. 6 shows a graph to illustrate the dependence of the milling performance on the milling depth at various rotational speeds of the milling drum.

In FIGS. 5 and 6, the influence of the milling depth on the advance or the advance velocity (FIG. 5) and on the milling performance (FIG. 6) is described in greater detail in each case on the basis of three different rotational speeds of the milling drum 7. The curve shown by a dashed line is a higher rotational speed in this case, the dotted curve corresponds to a moderate rotational speed, and the solid line corresponds to a low rotational speed, so that overall: dashed rotational speed>dotted rotational speed>solid rotational speed. The indicated curves and numeric ratios which can be derived thereon are only to be understood in this case as examples for illustrating the principles on which the present invention is based. FIG. 5 illustrates that in the case of increasing milling depths, on the one hand, the advance velocity in meters per minute decreases at constant rotational speed (in rotations per unit of time), and specific rotational speeds are usable, in particular, only at specific milling depths. The curves each originate in this case from a constant drive power of the drive unit. FIG. 6 illustrates, in particular, with the curve of the solid line that specific rotational speeds have an optimum milling depth with regard to the milling performance, which is reflected in the apex 27 in the curves in FIG. 6. FIG. 6 therefore illustrates, in particular, that the milling performance in volume per unit of time is not linearly related to the milling depth. In particular, the milling performance, i.e., the milled soil volume per unit of time, can substantially decrease in the case of milling depths which go beyond the apex 27 of the respective rotational speed. Therefore, with predefined milling depth for the respective milling operation, the maximum milling performance, i.e., the optimum rotational speed of the milling drum to obtain the maximum advance of the ground milling machine 1, is to be ascertained. This is enabled by the method specified in greater detail in FIG. 7, of which the system specified in FIG. 4 including the control unit 24 is capable.

Figure 7:
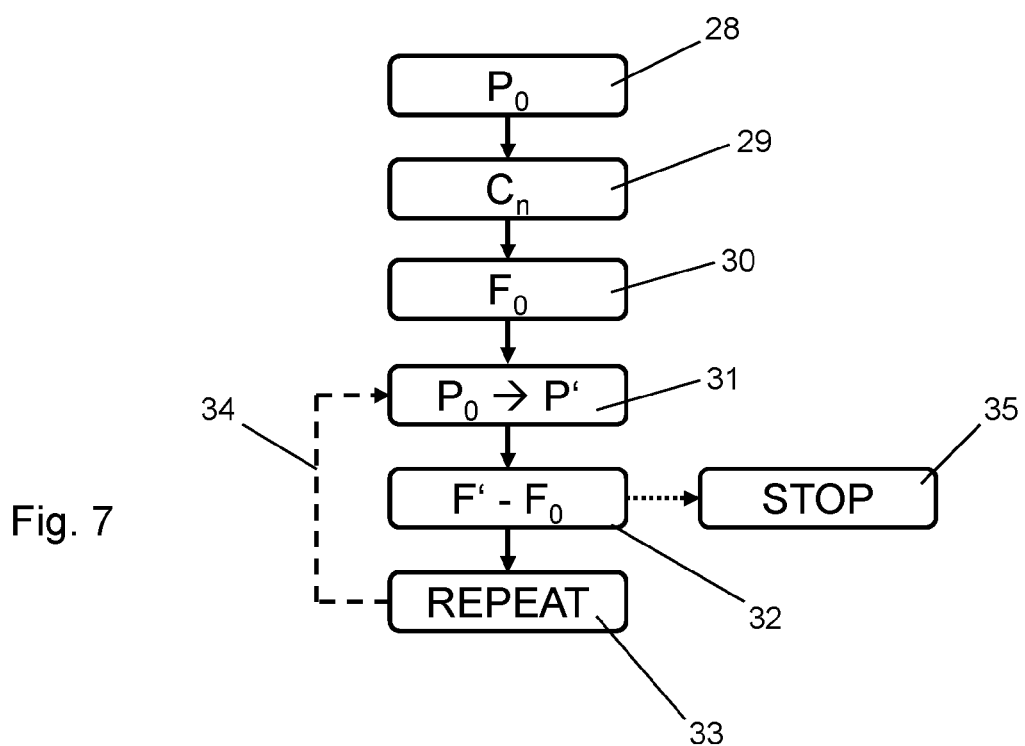
FIG. 7 shows a flow chart for carrying out a method according to the present invention.

The essential steps of the method according to the present invention are summarized in FIG. 7. In step 28, firstly a starting value $P_0$ of a variable operating parameter is predefined, for example, the rotational speed of the milling drum 7. In step 29, the constant operating parameter $C_n$, for example, the milling depth, is established and set, i.e., the ground milling machine assumes its milling position to obtain the constant operating parameter $C_n$ with the starting value $P_0$ of the variable operating parameter. Subsequently, the milling operation is started, and the starting value $F_0$ of the operating function to be optimized is ascertained. In step 31, the value P of the variable operating parameter is varied in milling operation toward an alternative value P', which is greater or less than the starting value $P_0$ of the variable operating parameter. The control unit 24 now ascertains the effect of the change of the starting value $P_0$ of the variable operating parameter carried out toward the alternative value P' of the variable operating parameter via the respective suitable sensor system, for example, the velocity sensor 25, and checks, in particular, whether the value F of the operating function to be optimized increases or decreases. Following this, step 31 is repeated.

During the repetition of step 31, the method may differ as to the rules according to which the exact value is established by which the variable operating parameter is varied. For example, the method can be executed such that in the event of an increase of the value F of the operating function to be optimized, step 31 is repeated in that the value P of the variable operating parameter is varied further in the same direction. Accordingly, if the value P of the variable operating parameter was increased, during the repetition of step 31, a further increase of the value P of the variable operating parameter is performed. In contrast, if the value F of the operating function decreases, the value P of the variable operating parameter is varied in the opposite direction relative to $P_0$. Accordingly, if the value P was previously increased, it is now decreased and vice versa. Steps 31 and 32 are repeated according to step 33 until an optimum value $F_{max}$ of the operating function of the ground milling machine 1 for the predefined constant operating parameters $C_n$ is achieved. This is expressed in that a variation of the value P of the variable operating parameter toward greater values of the variable operating parameter and toward lesser values of the operating parameter results in a reduction of the value F of the operating function to be optimized in each case. In FIG. 7, the variable operating parameter P is, for example, the milling drum rotational speed.

Fundamentally, other methods are also possible for the variation of a variable operating parameter, for example, scalar optimization methods (in which the variation of the variable operating parameters is only performed in fixed intervals), local optimization methods (for example, the gradient method), global optimization methods (for example, Bayesian optimization), linear optimization methods (such as the simplex method), or nonlinear optimization methods (for example, the hill climbing algorithm, simulated cooling, or the Metropolis-Hastings algorithm). The optimization method used determines, inter alia, in each case whether and by which value and at which time intervals a variation of the variable operating parameter takes place in step 31 in a specific system state. The system state comprises in this case at least the entirety of the current values of all constant and variable operating parameters and the value of the operating function to be optimized. Depending on the selection of the optimization method used, the system state can additionally comprise values of the variable operating parameter and the operating function to be optimized in the course of the present work operation and/or values of the variable operating parameter and the operating function to be optimized during preceding work operations.

In particular, the number of the variable operating parameters is not limited to a single operating parameter. Depending on the operating function to be optimized, it can be advantageous to vary multiple operating parameters at the same time or alternately within a shared optimization method. The optimization of the power efficiency of the milling operation may serve as an example here, i.e., the ratio of the motor power of the milling drum drive unit (for example, the main drive unit 4 or the auxiliary drive unit 20) to the milling performance in the case of variable rotational speed of the milling drum and variable motor power of the milling drum drive unit. The rotational speed of the milling drum and the motor power of the drive motor are thus the variable operating parameters, while the power efficiency of the milling operation represents the operating function to be optimized. The specific method for optimizing the power efficiency of the milling operation begins in that the starting values for the rotational speed and power of the milling drum drive unit are set in step 28. Subsequently, in step 29, the constant operating parameters, for example, the milling depth, are set, and then in step 30, the starting advance velocity is measured, the milling performance is calculated from the starting advance velocity and the milling depth, and the starting power efficiency of the milling operation is ascertained from the milling performance thus calculated and the drive power. Subsequently, in step 31, the rotational speed of the milling drum and/or the motor power of the milling drum drive unit are varied, wherein the exact value of the respective variation is dependent on the specific optimization method used. Thereafter, in step 32, the effect of this parameter change on the advance velocity is then measured, and then, similarly to step 30, the power efficiency of the milling operation is calculated and compared to the starting power efficiency of the milling operation. In step 33, steps 31 and 32 are then either repeated until a specific termination criterion has been reached (for example, if, over a specific number of cycles through steps 31 and 32, neither an increase nor a decrease of the two parameter values causes an increase of the power efficiency), or steps 31 and 32 are repeated over the entire further milling operation. The latter method is advantageous, in particular, with heterogeneous ground conditions, where the ideal rotational speed and the ideal power of the drive unit change in work operation depending on the properties of the ground material to be milled.

A further field of use for an optimization method according to the present invention of an operating function of a ground milling machine is offered by the working mode "fine milling". In fine milling operation, the ratio of milling drum rotational speed U and advance velocity v is preferably to be kept constant, to ensure a uniformly milled surface. Thus, a target ratio exists between milling drum rotational speed and advance velocity. To enable the most flexible possible work in fine milling operation at different advance velocities, the ratio of milling drum rotational speed U and advance velocity v are thus to be caused to remain constant over the entire work operation. Due to this specification, a known target advance velocity $v_s$ results for each milling drum rotational speed U. Therefore, the operating variable to be optimized in work operation consists of the difference between the actual advance velocity v and the target advance velocity $v_s$, which are dependent on the rotational speed, for the present milling drum rotational speed U. For the specific implementation, in step 28, a starting value is established for the advance velocity $v_0$ and the rotor rotational speed $U_0$, respectively. In subsequent step 29, the values of the constant operating parameters, for example, the value of the milling depth T, are established. Initially, no variation of the rotor rotational speed U takes place in step 31. In step 32, the value of the actual advance velocity is now compared to the value of the target advance velocity. With uniform properties of the milled material, it can be presumed that the ratio of the two present values of actual advance velocity and target advance velocity still correspond to the starting ratio. However, as soon as the material properties change, i.e., for example, the density of the milled material increases, the actual advance velocity can deviate from the target advance velocity, for example, because the density of the milled material becomes the limiting factor of the advance velocity at uniform rotational speed of the milling rotor. To still ensure a uniformly milled surface, the rotational speed of the milling rotor must also be adapted as a reaction to the changed advance velocity, for example, in the event of decreasing actual advance velocity, the rotational speed of the milling rotor must also be adapted in the same ratio. This adjustment is performed in step 31. However, as is apparent from FIGS. 5 and 6, for example, there is an effect relationship between the rotational speed of the milling rotor and the advance velocity. Therefore, a variation of the rotor rotational speed performed in step 31 into higher or lower rotational speed ranges can therefore cause the advance velocity to increase or decrease again, which is checked in step 32. Such a change of the advance velocity caused by rotational speed variation has the effect that the actual advance velocity no longer corresponds to the target advance velocity to which the rotor rotational speed was previously adjusted in step 31, and therefore makes a further optimization according to step 33 necessary, i.e., a repetition of steps 31 and 32. This repetition is now performed until the actual advance velocity and the target advance velocity correspond to each other, therefore the target ratio of rotor rotational speed to advance velocity is achieved, and thus the desired milled surface is obtained. A similar method applies to the working mode "mixing" in the case of a stabilizer/recycler, where a uniformly mixed surface is to be created by a uniform ratio of advance velocity v and rotor rotational speed U.

In the present exemplary embodiment of the method according to the present invention, it is provided that the method specified in FIG. 7 is carried out repeatedly over the entire milling process according to step 34, so that an adjustment of the milling drum rotational speed to the maximum possible advance velocity takes place permanently. The starting rotational speed $U_a$ corresponds to the varied rotational speed $U_x$ of the preceding passage. In the specific exemplary embodiment, this sequence, which is repeated over the entire milling process, furthermore takes place in a time-controlled manner after passage of a fixed time interval. However, it is alternatively also possible that this process is carried out until a maximum advance velocity $v_{max}$ is first achieved and subsequently the parameters then present with respect to the milling drum rotational speed are maintained. Accordingly, the process specified in FIG. 7 is stopped in step 35.

To carry out this method, it is specified in the exemplary embodiment according to FIG. 4 that the control unit 24 controls the variations of the rotational speed of the output shaft 21 of the planetary transmission 17 by way of a control of the output rotational speed of the hydraulic motor 20 via the input shaft 23 of the planetary transmission 17.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A method for optimizing an operating function of a ground milling machine, comprising the following method steps:
    a) predefining a starting value ($P_0$) for a variable operating parameter of the ground milling machine;
    b) establishing and setting a value of at least one constant operating parameter ($C_n$) of the ground milling machine;
    c) starting the milling operation and detecting a starting value ($F_0$) of an operating function to be optimized of the ground milling machine;
    d) varying a value (P) of the variable operating parameter in milling operation toward an alternative value (P') which is greater or less than the starting value ($P_0$);
    e) checking whether a value (F) of the operating function to be optimized increases or decreases;
    f) repeating steps d) and e) until reaching an optimum value of the operating function, wherein the optimum value of the operating function can be a maximum value or a minimum value.

2. The method according to claim 1,
    wherein the variable operating parameter is the rotational speed of the milling drum or the motor power of the drive motor of the milling rotor.

3. The method according to claim 1,
    wherein the operating function to be optimized is the advance velocity of the ground milling machine or the milling performance of the ground milling machine or the fuel efficiency of the ground milling machine or the deviation of the actual advance velocity of the ground milling machine from a target advance velocity.

4. The method according to claim 1,
    wherein the variation of the value of the operating parameter (P) according to step d) is performed at fixed intervals of the value of the operating parameter.

5. The method according to claim 1,
    wherein the checking according to step e) is performed in such a manner that exceeding or falling below difference threshold values of the operating function is checked.

6. The method according to claim 1,
    wherein after reaching the optimum value of the operating function in step f), the milling operation is continued with the operating parameter (P') then ascertained.

7. The method according to claim 1,
    wherein steps a) to f) are continued continuously over the entire milling process.

8. The method according to claim 1, wherein the variable operating parameter is the rotational speed of the milling drum,
    and further wherein the variation of the rotational speed (U) according to step d) of the milling drum is performed via a summation transmission, in particular a planetary transmission, by variation of at least one input rotational speed of one of at least two drive units.

9. The method according to claim 1,
    wherein steps a) to f) are controlled by an automatic controller.

10. A ground milling machine, comprising:
    a machine frame, travel units, a drive unit, and a milling drum, to which drive energy is transmittable from the drive unit via a drive train, and a unit for ascertaining the advance velocity,
    wherein a control unit for controlling the milling drum operation is provided, which is implemented in such a manner that, proceeding from a predefined starting advance velocity, the control unit varies the rotational speed (U) of the milling drum from a starting rotational speed ($U_a$) to achieve a maximum advance velocity, and
    wherein the ground milling machine is implemented to carry out the method of claim 1.

11. The ground milling machine according to claim 10,
    wherein the ground milling machine is a road milling machine.

12. The ground milling machine according to claim 10,
    wherein the control unit is implemented to control an auxiliary drive, the drive power of which is fed via a summation transmission into a drive train between the main drive unit and the milling drum.

13. The ground milling machine according to claim 12,
    wherein the summation transmission is a planetary transmission.

14. The ground milling machine according to claim 12,
    wherein the auxiliary drive is an electric motor or a hydraulic motor.

15. The ground milling machine according to claim 12,
    wherein the ground milling machine is a central rotor milling machine.

* * * * *